United States Patent [19]

Hagiwara et al.

[11] 4,373,046

[45] Feb. 8, 1983

[54] FLAME-RETARDANT AND RADIATION-RESISTANT POLYMER COMPOSITION AND A RESIN MOLDED PRODUCT PREPARED THEREFROM

[75] Inventors: Miyuki Hagiwara, Maebashi; Yousuke Morita, Takasaki, both of Japan

[73] Assignee: Japan Atomic Energy Research Institute, Tokyo, Japan

[21] Appl. No.: 233,134

[22] Filed: Feb. 10, 1981

[30] Foreign Application Priority Data

Mar. 3, 1980 [JP] Japan .................................. 55-26383

[51] Int. Cl.³ .......................... C08K 5/03; C08L 57/08
[52] U.S. Cl. .................................... 524/285; 524/367; 524/467; 525/104; 525/129; 525/165; 525/178; 525/209; 525/210; 525/232; 526/280
[58] Field of Search .......... 260/42.39, 42.42, 45.7 RL, 260/45.85 E, 45.95 G; 428/379; 525/289, , 209, 210; 570/183, 190; 524/285, 367, 467

[56] References Cited

U.S. PATENT DOCUMENTS

| | | | |
|---|---|---|---|
| 3,668,280 | 6/1972 | Bonvicini et al. .................... | 525/210 |
| 3,908,067 | 9/1975 | Mackenzie, Jr. et al. ... | 260/45.85 E |
| 3,929,939 | 12/1975 | Salyer et al. ..................... | 260/42.39 |
| 4,041,016 | 8/1977 | Fenoglio ..................... | 260/45.7 RL |
| 4,049,727 | 9/1977 | Gelfand ................. | 570/190 |
| 4,093,678 | 6/1978 | Bailey et al. ........................ | 525/210 |
| 4,127,559 | 11/1978 | Newcombe ................. | 260/45.7 RL |
| 4,200,702 | 4/1980 | Gausepohl et al. ......... | 260/45.7 RL |

*Primary Examiner*—John Kight, III
*Assistant Examiner*—R. A. White
*Attorney, Agent, or Firm*—Browdy & Neimark

[57] ABSTRACT

A flame-retardant and radiation-resistant polymer composition comprising a polymer and a halogenated acenaphthylene condensate having a structural unit of the formula (I) or (II):

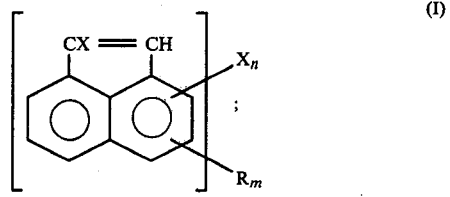

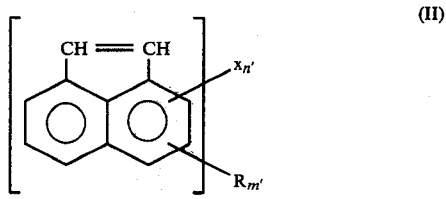

(wherein X is chlorine or bromine, n and n' are each an integer of 2 to 6, R is a substituent other than halogen, m and m' are each an integer of 0 to 4, n (or N')+m(or m')≦6, and when m or m' is 2 or more, each R may be the same or different) and a flame-retardant and radiation-resistant resin molded product prepared therefrom are herein disclosed.

19 Claims, No Drawings

FLAME-RETARDANT AND RADIATION-RESISTANT POLYMER COMPOSITION AND A RESIN MOLDED PRODUCT PREPARED THEREFROM

BACKGROUND OF THE INVENTION

1. Field of the Invention

This invention relates to a flame-retardant and radiation-resistant polymer composition and to a resin molded product prepared therefrom.

2. Description of the Prior Art

Various flame retardants are incorporated in inflammable resins such as polyethylene, polypropylene and ethylenepropylene rubber for the purpose of making them flame retardant. Known flame retardants include halogenated aliphatic compounds such as chlorinated paraffin and chlorinated polyethylene and halogenated aromatic compounds such as hexabromobenzene and decabromodiphenyl ether. The halogenated aliphatic compounds of high molecular weight like chlorinated polyethylene are not greatly compatible with resins and can be used in only few resins such as polyethylene. On the other hand, the halogenated aromatic compounds having a low molecular weight may exude to the surface of the resin upon extended use or evaporate at high temperatures, and in consequence, the flame retardancy of the resin treated with these compounds has a tendency to change with time.

The current criterion for providing safety in nuclear reactors, breeder reactors and ionizing radiation generators is that they use flame-retardant electric wires, cables, and other devices. Therefore, the resin compositions such as insulation coatings of electric wires and cables, electric insulators for various applications, packings, sealants, frames and hoses must be flame retardant and resistant to radiation as well.

U.S. Pat. No. 3,927,145 to Bruno L. Gaeckel et al. discloses that flame resistant characteristics of polyolefins can be improved by incorporating hexabromobiphenyl therein, but does not teach or suggest the improvement of radiation resistance.

U.S. Pat. No. 4,127,559 to Jack Newcombe et al. discloses that halogenated compounds of Diels-Alder adduct can impart flame retardancy to normally flammable organic polymers, but does not teach or suggest the improvement of radiation resistance.

U.S. patent application Ser. No. 114,420, now U.S. Pat. No. 4,289,687, discloses the improvement of fire retardancy of polymers by incorporating monomer of halogenated acenaphthylene compound therein.

SUMMARY OF THE INVENTION

Therefore, main object of this invention is to provide a polymer composition having improved flame-retardant and radiation-resistant properties.

The other object of this invention is to provide a method for making a flame-retardant polymer that does not let a flame retardant exude or evaporate and which hence remains consistently flame-retardant over an extended period of time.

Another object of this invention is to provide a flame-retardant and radiation-resistant resin molded product prepared from the polymer composition.

A further object of this invention is to provide a halogenated acenaphthylene condensate which can make a polymer flame-retardant and radiation-resistant.

Other objects of this invention in part will be obvious and in part pointed hereinafter.

DETAILED DESCRIPTION OF THE INVENTION

This invention relates to a flame-retardant and radiation-resistant polymer composition, and to a flame-retardant and radiation-resistant resin molded product.

The objects of this invention can be achieved by incorporating in, and blending with, a polymer a halogenated acenaphthylene condensate having a structural unit of the formula (I) or (II):

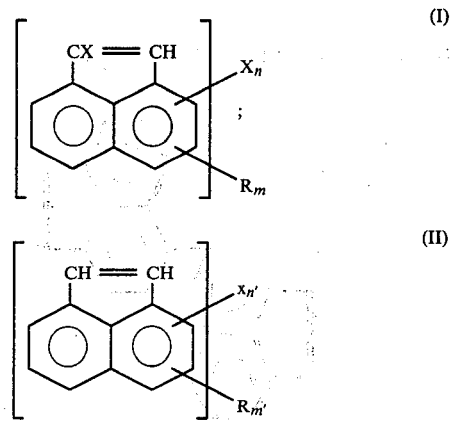

(wherein X is chlorine or bromine, n and n' are each an integer of 2 to 6, R is a substituent other than halogen, preferably alkyl, alkoxy or alkylester of 1-4 carbons, m and m' are each an integer of 0 to 4, n (or n')+m (or m') ≦6, and when m or m' is 2 or more, each R may be the same or different).

The term "halogenated acenaphthylene condensate" as used herein means halogenated acenaphthylenes that are condensed by dehydrogenation or dehydrohalogenation to produce an oligomer having a degree of condensation of 2 or more. Acenaphthylene units are readily bonded to each other at, say, 1 (or 2)-and 5'-positions

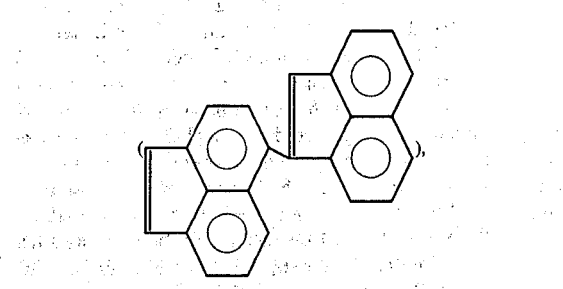

1 (or 2)-and 6'-positions

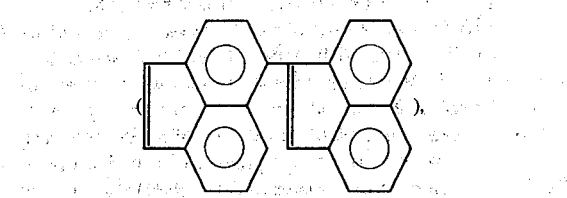

4-and 4'-(or 4 and 7', or 7 and 7')-positions

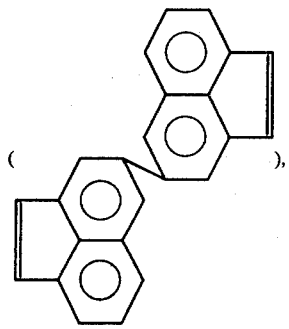

4-and 5'-(or 4 and 6', or 5 and 7')-positions

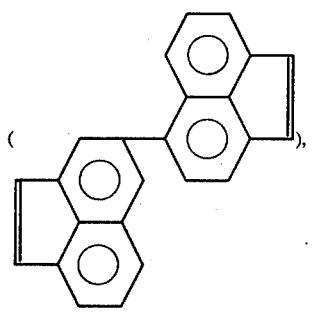

and 5-and 5'-(or 5 and 6')-positions

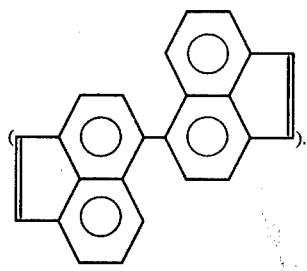

The units may also be bonded at 1 and 1', 1 and 2', 1 (or 2) and 3', 1 (or 2) and 4', 1 (or 2) and 7', 1 (or 2) and 8', 3 and 3', 3 and 4', 3 and 5', 3 and 6', 3 and 7', 3 and 8' and 4 and 8' positions. They may even be condensed by two bonds, say, at 5-5' and 6-6' positions or at 4-7' and and 6-6' positions. A halogenated acenaphthylene condensate having a degree of condensation of 3 or more can be produced by increasing the number of the structural units according to one of the methods of condensation described above. As will be described in the examples herein, the halogenated acenaphthylene condensate can be synthesized by first introducing a halogen at the allyl or benzyl position of each acenaphthylene unit and then by treating the units in the presence of a catalyst taking advantage of the high reactivity of the halogen.

The halogenated acenaphthylene condensate is satisfactorily compatible with polymers in the absence of a substituent, but the compatibility of the two is increased by introducing a methyl, methoxy or methyl ester group into the condensate. By doing this, the blending of the condensate with the polymer and the shaping of the blend become much easier and the possibility of the condensate to evaporate or exude during service at high temperatures and over an extended period of time is minimized. But a substituent having too many carbon atoms is difficult to introduce, and the introduction of a long-chain alkyl group should be avoided because it results in low flame retardancy and radiation resistance. Examples of the substituent that can be introduced into the halogenated acenaphthylene condensate to increase its miscibility with polymers include an alkyl group having 1 to 4 carbon atoms, an alkoxy group, and an alkyl ester group.

The double bond between carbon atoms at 1- and 2-positions of halogenated acenaphthylene units has radical polymerizability. Therefore, by subjecting a shaped blend of a polymer and the halogenated acenaphthylene condensate to a treatment for generating free radicals, the acenaphthylene units react with each other in the polymer or they are grafted on the polymer. This technique is used with advantage for providing a shaped polymer article having satisfactorily high flame retardancy and radiation resistance. The yield of the reaction that occurs as a result of the treatment for generating free radicals can be increased effectively by introducing a polymerizable functional group in the condensate as a substituent or by copolymerizing the condensate with a suitable radical polymerizable compound or grafting both the condensate and a radical polymerizable compound on the polymer. Examples of the polymerizable functional group that can be introduced easily as a substituent are propenyl and p-vinylbenzyl groups.

Examples of the polymer that can be rendered flame-retardant by the method of this invention include polyethylene, polypropylene, polybutene, ethylene-vinyl acetate copolymer, ethylene-ethyl acrylate copolymer, ethylene-propylene copolymer, ethylene-propylene-diene copolymer, ethylene-vinyl chloride copolymer, ethylene-vinyl acetate-vinyl chloride graft copolymer, ethylene-ethyl acrylate-vinylchloride graft copolymer, ethylene-propylene-vinyl chloride graft copolymer, chlorinated polyethylene, chlorinated polyethylene-vinyl chloride graft copolymer, polyurethane, polyamide, polyester, acrylic resin, butyl rubber, chloroprene rubber, nitrile rubber, natural rubber, silicone rubber, chlorosulfonated polyethylene, styrene-butadiene rubber, styrene-butadiene-acrylonitrile copolymer, acrylonitrile-styrene copolymer, and polyester-ether elastomer.

The halogenated acenaphthylene condensate is incorporated in these polymers preferably in an amount of 5 to 150 parts by weight based on 100 parts by weight of the polymer. The condensate used in an amount of less than 5 parts by weight is not sufficient to make the polymer satisfactorily flame-retardant, and beyond 150 parts by weight, the desired elongation properties or flexibility of the polymer is not assured. The polymer containing at least 0.5 parts by weight of the condensate shows increase in radiation resistance, and the more condensate it contains, the more resistant it is against radiation. To achieve higher flame retardancy, a blend of the polymer and condensate preferably contains an inorganic filler such as antimony trioxide, aluminum hydroxide or talc. It is to be understood that the blend may further contain a reinforcing agent, extender, pigment, lubricant, heat or light stabilizer, or an agent for providing radiation resistance.

For effective generation of free radicals in the presence of halogenated acenaphthylene, an organic peroxide such as dicumyl peroxide or di-tert.-butyl peroxide is preferably added to the acenaphthylene and heated, or alternatively, the acenaphthylene is irradiated with ionizing radiation such as beta-rays, gamma-rays and accelerated electron beams.

This invention is now described in greater detail with reference to the following examples, reference examples and comparative examples which are given here for illustrative purposes only and are by no means intended to limit the scope of the invention. In the examples and comparative examples, all components other than a free radical generator were blended into a uniform mixture with hot rolls at 120° C., and to the mixture, a free radical generator was added at 20° C. to 70° C. The mixture containing the free radical generator was hot-pressed at 160° C. for 30 minutes into a sheet having a thickness of either 1 or 3 mm. The degree of condensation of the halogenated acenaphthylene condensates used in the examples and comparative examples was determined by gel-permeation chromatography (GPC).

REFERENCE EXAMPLE 1

A mixture of 1 mol of 1,2,3,5-tetrabromoacenaphthylene ($C_{12}H_6Br_4$) in 500 g of benzene and 2 mols of potassium bromide and 0.2 mols of potassium bromate in 600 g of water was placed in a three-necked flask and stirred vigorously in a dark place. Two mols of concentrated sulfuric acid diluted with an equal volume of water was added dropwise to the mixture under agitation at about 10° C. Following a 3-hr reaction, the benzene layer was washed sequentially with water, aqueous caustic soda (2%) and water, and dried with silica gel. A solution of the dried benzene was transferred to a three-necked flask where it was dehydrobromated with a solution of about 2 mols of potassium hydroxide in hot ethanol that was added dropwise through the dropping funnel. After the reaction, the benzene layer was washed with water and dried. After distilling benzene off under vacuum, the residue was washed thoroughly with hot acetone and dried to provide a bromoacenaphthylene condensate. It was estimated by elemental analysis that the condensate had a rational formula of $(C_{12}H_{3.7}Br_{2.9})_l$. GPC showed that it had a degree of condensation $l$ in the range of from 2 to 5.

REFERENCE EXAMPLE 2

A solution of 1,2,3,5-tetrabromoacenaphthylene in chloroform was mixed with a catalytic amount of stannic chloride, and the mixture was refluxed gently for about 3 hours. After the reaction, the mixture was washed with water, dried and chloroform was distilled off. Then, the residue was dissolved in benzene and the solution was dehydrobromated in the same manner as in Reference Example 1. The benzene layer was washed with water, dried and freed of benzene by distillation, and the residue was washed thoroughly with hot acetone. The resulting bromoacenaphthylene condensate had a rational formula of $(C_{12}H_{4.1}Br_{2.3})_l$, and GPC showed that it had a degree of condensation $l$ in the range of from 2 to 7.

EXAMPLE 1

A sheet was prepared from a mixture of the following components.

| | |
|---|---|
| Polyethylene (ZF-30 of Mitsubishi Petrochemical Company Ltd.) | 100 (parts by wt.) |
| Chlorinated polyethylene (Cl content = 40%) | 35 (parts by wt.) |
| Oligomer (2-5) in Ref. Ex. 1 | 30 (parts by wt.) |
| Antimony trioxide | 20 (parts by wt.) |
| 2,6-Di-tert.-butylphenol | 0.5 (parts by wt.) |
| Dicumyl peroxide | 3 (parts by wt.) |

EXAMPLE 2

A sheet was prepared from a mixture of the following components.

| | |
|---|---|
| Ethylene-vinyl acetate copolymer (Yukaron-eva 25K of Mitsubishi Petrochemical Company Ltd.) | 100 (parts by wt.) |
| Oligomer (2-7) prepared in Ref. Ex. 2 | 35 (parts by wt.) |
| Antimony trioxide | 15 (parts by wt.) |
| 2,6-Di-tert.-butylphenol | 0.5 (parts by wt.) |
| Dicumyl peroxide | 3 (parts by wt.) |
| Talc | 50 (parts by wt.) |

EXAMPLE 3

A sheet was prepared from a mixture of the following components.

| | |
|---|---|
| Ethylene-propylene-diene copolymer (EP-21 of Japan Synthetic Rubber Co., Ltd.) | 100 (parts by wt.) |
| Oligomer (2-5) prepared in Ref. Ex. 1 | 45 (parts by wt.) |
| Antimony trioxide | 20 (parts by wt.) |
| 2,6-Di-tert.-butylphenol | 0.5 (parts by wt.) |
| Dicumyl peroxide | 4.5 (parts by wt.) |
| Talc | 100 (parts by wt.) |

EXAMPLE 4

A sheet was prepared from a mixture of the following components.

| | |
|---|---|
| Ethylene-propylene-diene copolymer (EP-21 of Japan Synthetic Rubber Co., Ltd.) | 100 (parts by wt.) |
| Oligomer (2-7) prepared from 3-methyl-1,2-dichloro-6,8-dibromoacenaphthylene by the method of Ref. Ex. 1 | 30 (parts by wt.) |
| Antimony trioxide | 10 (parts by wt.) |
| 2,6-Di-tert.-butylphenol | 0.5 (parts by wt.) |
| Dicumyl peroxide | 3 (parts by wt.) |
| Talc | 100 (parts by wt.) |

COMPARATIVE EXAMPLE 1

A sheet was prepared from a mixture of the following components.

| | |
|---|---|
| Polyethylene (ZF-30 of Mitsubishi Petrochemical Company Ltd.) | 100 (parts by wt.) |
| Chlorinated polyethylene (Cl content = 40%) | 35 (parts by wt.) |
| 2,4,3',5'-tetrabromosalicylanilide $\left[ Br-\underset{Br}{\underset{|}{\bigcirc}}-\underset{\underset{O}{\overset{\|}{C}}}{\overset{}{}}-\underset{H}{\overset{}{N}}-\underset{}{\bigcirc}-Br \atop Br \right]$ | 30 (parts by wt.) |
| Antimony trioxide | 20 (parts by wt.) |

-continued

| | |
|---|---|
| 2,6-Di-tert.-butylphenol | 0.5 (parts by wt.) |
| Dicumyl peroxide | 3 (parts by wt.) |

COMPARATIVE EXAMPLE 2

A sheet was prepared from a mixture of the following components.

| | |
|---|---|
| Ethylene-propylene-diene copolymer (EP-21 of Japan Synthetic Rubber Co., Ltd.) | 100 (parts by wt.) |
| 3,5,3',5'-tetrabromodiphenyl  | 30 (parts by wt.) |
| Antimony trioxide | 10 (parts by wt.) |
| 2,6-Di-tert.-butylphenol | 0.5 (parts by wt.) |
| Dicumyl peroxide | 100 (parts by wt.) |

COMPARATIVE EXAMPLE 3

A sheet was prepared from a mixture of the following components.

| | |
|---|---|
| Ethylene-propylene-diene copolymer (EP-21 of Japan Synthetic Rubber Co., Ltd.) | 100 (parts by wt.) |
| Decabromodiphenyl ether 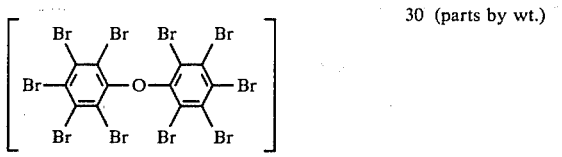 | 30 (parts by wt.) |
| Antimony trioxide | 15 (parts by wt.) |
| 2,6-Di-tert.-butylphenol | 0.5 (parts by wt.) |
| Dicumyl peroxide | 3 (parts by wt.) |
| Talc | 100 (parts by wt.) |

The flame retardancy of the sheets prepared above is set forth in the following table.

| Flame retardancy | Sample | | | | | | |
|---|---|---|---|---|---|---|---|
| | Ex. 1 | Ex. 2 | Ex. 3 | Ex. 4 | Com. Ex. 1 | Com. Ex. 2 | Com. Ex. 3 |
| number of contacts with frame required to ignite the sheet | 8 | 6 | 8 | 6 | 3 | 3 | 6 |
| oxygen index | 28 | 27 | 32 | 27 | 25 | 26 | 27 |

Notes:

1. The "number of contacts required to ignite the sheet" were determined by a test in accordance with UL-94. Since every sheet sample was acceptable in a test of UL-94V-0 (two flame contacts were made to see if the sample was acceptable), the flame retardancy of the samples was evaluated by determining the number of contacts required before sustained burning of the samples began. The "sustained burning" means the case where the part of a sample contacted by the flame of a burner keeps burning for more than one minute after removal of the flame.

2. The oxygen index was determined in accordance with JIS K7201.

EXAMPLES 5 AND 6

A 2 mm sheet of flame-retardant polyethylene having the composition indicated in Example 1 and a sheet of the same thickness of flame-retardant ethylene-propylene-diene copolymer having the composition indicated in Example 3 were irradiated with 100 Mrad of gamma-rays in air at room temperature. The radiation resistance of the two sheets was evaluated by measuring the tensile strength and elongation of the samples both before and after the irradiation. The results are set forth in the following table together with those for the samples of the compositions indicated in Comparative Examples 1 and 3.

| Characteristics | | Sample | | | |
|---|---|---|---|---|---|
| | | Ex. 5 | Ex. 6 | Com. Ex. 1 | Com. Ex. 3 |
| tensile strength (kg/cm$^2$) | before irrad. | 1.75 | 0.59 | 1.70 | 0.50 |
| | after irrad. | 1.87 | 0.62 | 1.65 | 0.45 |
| elongation (%) | before irrad. | 580 | 705 | 580 | 720 |
| | after irrad. | 320 | 400 | 190 | 170 |

As is clear from the comparison with the results for the samples having the compositions of Comparative Examples 1 and 3, the method of this invention provides a flame-retardant resin composition that undergoes less decrease in elongation and which has higher resistance to radiation.

In conclusion, by using the flame retardant specified herein, the method of this invention provides a shaped resin article having high flame retardancy and radiation resistance at the same time, and hence is believed to make a great contribution to the industry.

What is claimed is:

1. A flame-retardant and radiation-resistant polymer composition comprising a polymer and a halogenated acenaphthylene condensate having a structural unit of the formula (I) or (II):

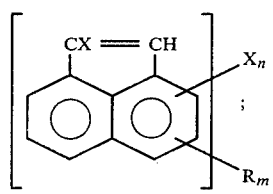

(I)

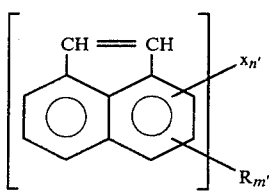

(II)

wherein X is chlorine or bromine, n and n' are each an integer of 2 to 6, R is a substituent selected from the group consisting of alkyl, alkoxy and alkylester of 1-4 carbons; m and m' are each an integer of 0 to 4, n (or n')+m (or m')≦6, and when m or m' is 2 or more, each R may be the same or different.

2. A polymer composition according to claim 1 wherein 5 to 150 parts by weight of the halogenated acenaphthylene condensate is incorporated in 100 parts by weight of the polymer.

3. A polymer composition according to claim 1, wherein the polymer is selected from the group consisting of polyethylene, polypropylene, polybutene, ethylene-vinyl acetate copolymer, ethylene-ethyl acrylate copolymer, ethylene-propylene copolymer, ethylene-propylene-diene copolymer, ethylene-vinyl chloride copolymer, ethylene-vinyl acetate-vinyl chloride graft copolymer, ethylene-ethyl acrylate-vinyl chloride graft copolymer, ethylene-propylene-vinyl chloride graft copolymer, chlorinated polyethylene, chlorinated polyethylene-vinyl chloride graft copolymer, polyurethane, polyamide, polyester, acrylic resin, butyl rubber, chloroprene rubber, nitrile rubber, natural rubber, silicone rubber, chlorosulfonated polyethylene, styrene-butadiene rubber, styrene-butadiene-acrylonitrile copolymer, acrylonitrile-styrene copolymer, and polyester-ether elastomer.

4. A polymer composition according to claim 1, wherein the halogenated acenaphthylene condensate has at least one substituent group selected from the group consisting of alkyl group, alkoxy group and alkyl ester group.

5. A polymer composition according to claim 4, wherein the alkyl group has 1 to 4 carbon atoms.

6. A polymer composition according to claim 5, wherein the alkyl group is methyl.

7. A polymer composition according to claim 4, wherein the alkoxy group is methoxy.

8. A polymer composition according to claim 5, wherein the alkylester group is methyl ester.

9. A polymer composition according to claim 1, wherein an addition polymerizable functional group is introduced in the halogenated acenaphthylene condensate.

10. A polymer composition according to claim 9, wherein the addition polymerizable functional group is selected from the group consisting of propenyl and p-vinylbenzyl.

11. A flame retardant and radiation-resistant resin molded product prepared by blending a resin with a halogenated acenaphthylene condensate having a repeating unit of the formula (I) or (II):

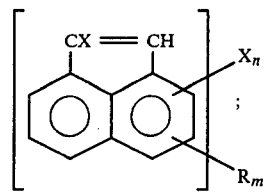

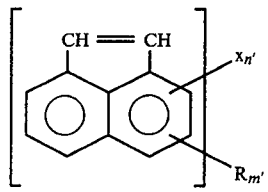

wherein X is chlorine or bromine, n and n' are each an integer of 2 to 6, R is a substituent selected from the group consisting of alkyl, alkoxy and alkylester of 1-4 carbons, m and m' are each an integer of 0 to 4, n (or n')+m (or m')≦6, and when m or m' is 2 or more, each R may be the same or different, and after molding, subjecting to a treatment with free radical generation.

12. A resin molded product according to claim 11 wherein 5 to 150 parts by weight of the halogenated acenaphthylene condensate is incorporated in 100 parts by weight of the polymer.

13. A resin molded product according to claim 11, wherein the resin is selected from the group consisting of polyethylene, polypropylene, polybutene, ethylene-vinyl acetate copolymer, ethylene-ethyl acrylate copolymer, ethylene-propylene copolymer, ethylene-propylene-diene copolymer, ethylene-vinyl chloride copolymer, ethylene-vinyl acetate-vinyl chloride graft copolymer, ethylene-ethyl acrylate-vinyl chloride graft copolymer, ethylene-propylene-vinyl chloride graft copolymer, chlorinated polyethylene, chlorinated polyethylene-vinyl chloride graft copolymer, polyurethane, polyamide, polyester, acrylic resin, butyl rubber, chloroprene rubber, nitrile rubber, natural rubber, silicone rubber, chlorosulfonated polyethylene, styrene-butadiene rubber, styrene-butadiene-acrylonitrile copolymer, acrylonitrile-styrene copolymer, and polyester-ether elastomer.

14. A resin molded product according to claim 11, wherein the halogenated acenaphthylene condensate has at least one substituent group selected from the group consisting of alkyl group, alkoxy group and alkyl ester group.

15. A resin molded product according to claim 14, wherein the alkyl group has 1 to 4 carbon atoms.

16. A resin molded product according to claim 15, wherein the alkyl group is methyl.

17. A resin molded product according to claim 14, wherein the alkoxy group is methoxy.

18. A resin molded product according to claim 14, wherein the alkylester group is methyl ester.

19. A resin molded product according to claim 11, wherein an addition polymerizable functional group is introduced in the halogenated acenaphthylene condensate.

* * * * *